(12) United States Patent
Dancy et al.

(10) Patent No.: US 9,833,005 B1
(45) Date of Patent: Dec. 5, 2017

(54) TIMING DEVICE FOR SHRIMP PROCESSING EQUIPMENT

(71) Applicant: GREGOR JONSSON INC., Lake Forest, IL (US)

(72) Inventors: Michael Dancy, Gurnee, IL (US); James Groff, Antioch, IL (US)

(73) Assignee: GREGOR JONSSON INC., Lake Forest, IL (US)

( * ) Notice: Subject to any disclaimer, the term of this patent is extended or adjusted under 35 U.S.C. 154(b) by 0 days.

(21) Appl. No.: 15/401,820

(22) Filed: Jan. 9, 2017

(51) Int. Cl.
*A22C 29/00* (2006.01)
*A22C 29/02* (2006.01)

(52) U.S. Cl.
CPC .................. *A22C 29/026* (2013.01)

(58) Field of Classification Search
CPC ....... A22C 29/00; A22C 29/02; A22C 29/021; A22C 29/022; A22C 29/024
USPC ......................................................... 452/1–5
See application file for complete search history.

(56) References Cited

U.S. PATENT DOCUMENTS

| | | | | |
|---|---|---|---|---|
| 3,698,038 A | * | 10/1972 | Jones, Jr. ............. | A22C 29/005 452/184 |
| 4,472,858 A | * | 9/1984 | Keith ..................... | A22C 29/02 452/150 |
| 5,290,199 A | * | 3/1994 | Morris .................. | A22C 29/022 452/3 |
| 5,569,065 A | * | 10/1996 | Sawyer ................ | A22C 29/022 452/3 |
| 5,613,903 A | * | 3/1997 | Harris ................... | A22C 29/022 452/3 |
| 7,467,992 B2 | * | 12/2008 | Sawyer ................ | A22C 29/026 452/3 |
| 7,867,067 B2 | * | 1/2011 | Dancy .................. | A22C 29/026 452/5 |
| 8,079,896 B1 | * | 12/2011 | Sawyer ................ | A22C 29/022 452/3 |

* cited by examiner

*Primary Examiner* — Richard Price, Jr.
(74) *Attorney, Agent, or Firm* — Marshall, Gerstein & Borun LLP

(57) ABSTRACT

A shrimp processing machine includes an adjustable cutting assembly and an adjustable meat picking assembly. The adjustable cutting assembly is adapted to adjust between a first configuration that forms a cut having a first length on a shrimp and a second configuration that forms a cut having a second length on the shrimp. The adjustable cutting assembly is further adapted to adjust between a first position that forms a cut having a first depth on the shrimp and a second position that forms a cut having a second depth on the shrimp. The adjustable meat picking assembly is adapted to rotatably adjust when a meat picker contacts the shrimp to remove shrimp meat from a shrimp shell.

24 Claims, 14 Drawing Sheets

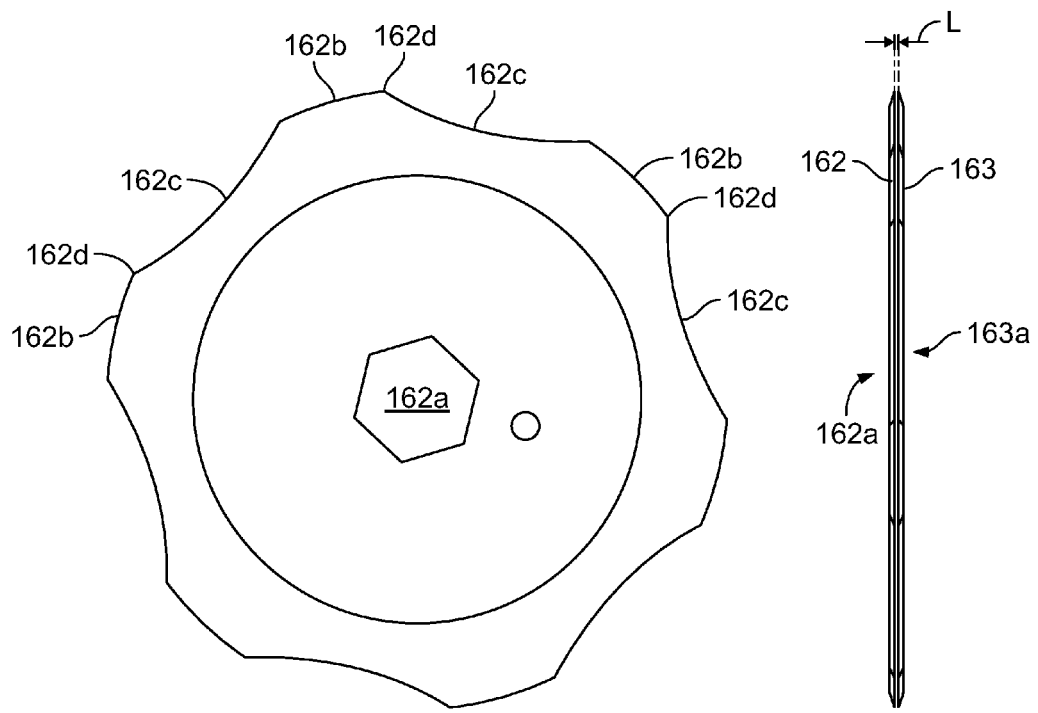
FIG. 6A  FIG. 6B

TIMING DEVICE FOR SHRIMP PROCESSING EQUIPMENT

FIELD OF THE DISCLOSURE

The present disclosure generally relates to a machine for processing shrimp and, more particularly, to a semi-automated machine for processing shrimp.

BACKGROUND

Various types of automated or semi-automated shrimp processing machines are used to partially or completely remove a shell of a shrimp, thus readying shrimp meat for cooking and consumption. Some of these machines also have cutting capabilities which can cut the shrimp meat at desired locations.

In one type of shrimp processing machine, a main gear is equipped with a number of clamps spaced about its periphery. These machines also include a loading tray for presenting the shrimp to the main gear. The shrimp are loaded onto the loading tray by an operator. As the clamps pass the trays, they are loaded with shrimp, and once loaded; the main gear continues to rotate, thereby moving each shrimp through various processing stations such as cutting stations, meat picking stations, and the like. The cutting station typically cuts a dorsal side of the shrimp shell, and optionally the meat, and the meat picking station removes the meat from the shell.

A popular shrimp cutting style is known as the "2-4 cut," where the shrimp is cut from the second through the fourth body sections. This type of cut results in a visually pleasing presentation for the consumer. While conventional processing machines are capable of processing shrimp at high speeds, the 2-4 cut and various other cuts are currently performed by hand, which is both time consuming and prone to differences in cut depth and length between individual shrimp.

Additionally, there can be difficulties when processing shrimp of differing sizes. Conventional machines oftentimes require extensive downtime in order to properly adjust and/or calibrate the machine to accommodate different sized shrimp, which in turn can increase overall production costs. Further, these machines oftentimes require significant adjustments and/or calibrations in order to process shrimp having different cut lengths and/or depths, as desired.

SUMMARY

In some embodiments of the present disclosure, a shrimp processing machine includes an adjustable cutting assembly and an adjustable meat picking assembly. The adjustable cutting assembly is adapted to adjust between a first configuration that forms a cut having a first length on a shrimp and a second configuration that forms a cut having a second length on the shrimp. The adjustable cutting assembly is further adapted to adjust between a first position that forms a cut having a first depth on the shrimp and a second position that forms a cut having a second depth on the shrimp. The adjustable meat picking assembly is adapted to rotatably adjust to modify when a meat picker contacts the shrimp to remove shrimp meat from a shrimp shell.

In some embodiments, an adjustable cutting assembly for a shrimp processing machine includes a cutter drive assembly including a drive gear coupled to an adjustable drive shaft, an adjustable roller plate coupled to the adjustable drive shaft and disposed adjacent to the drive gear, a cam plate having a first end and a second end, and a cutting device adapted to cut a shrimp that is coupled to the cam plate. The adjustable roller plate includes a roller coupling portion that secures a plurality of rollers to the adjustable roller plate and a roller adjusting portion that rotatably adjusts a position of the adjustable roller plate between at least a first position and a second position relative to the drive gear. The cam plate is pivotally supported at the first end and is adapted to contact the plurality of rollers to cause rotation about the first end of the cam plate. Upon contacting a first roller of the plurality of rollers, the cam plate is adapted to lower to a position that causes the cutting device to cut the shrimp. Upon contacting a second roller of the plurality of rollers, the cam plate is adapted to raise to a position that moves the cutting device away from the shrimp. When the adjustable roller plate is disposed in the first position, the cutting device is adapted to contact and cut the shrimp for a first amount of time. Upon rotatably adjusting the position of the adjustable roller plate to the second position, the cutting device is adapted to contact and cut the shrimp for a second amount of time.

In some of these embodiments, an adjustable cutting assembly for a shrimp processing machine includes a cam plate having a first end, a second end, and an angled contact surface. The assembly also includes a cutting device coupled to the cam plate which is adapted to cut a shrimp, a cutter bar coupled to the cam plate and the cutting device, and a cam adjusting assembly coupled to the cam plate and the cutter bar. The cutter bar includes a first end coupled to a shaft and a second end that pivotally rotates about the shaft. This rotation causes both the cam plate and the cutting device to pivotally rotate about the shaft. The cam adjusting assembly is adjustably moved between a first position and a second position. Upon adjusting the cam adjusting assembly between the first position and the second position, the angled contact surface of the cam plate moves relative to the cutter bar, thereby selectively adjusting a cut depth and length on the shrimp performed by the cutting device.

In some approaches, a meat picking assembly for a shrimp processing machine includes a meat picking fork mounted to an oscillating arm, a meat picking drive assembly operatively coupled to the oscillating arm, and a picker adjuster assembly operatively coupled to the meat picking fork and the meat picking drive shaft. In these approaches, the meat picking fork travels along a generally circular path to pierce a shrimp body to remove shrimp meat from a shrimp shell. The meat picking drive assembly adapted to rotatably drive the meat picking assembly. The picker adjuster assembly includes an adjuster knob that temporarily decouples at least a portion of the meat picking drive assembly from the meat picking fork to rotatably adjust the meat picking fork between at least a first position along the generally circular path and a second position along the generally circular path.

BRIEF DESCRIPTION OF THE DRAWINGS

The above needs are at least partially met through provision of the shrimp processing device described in the following detailed description, particularly when studied in conjunction with the drawings, wherein:

FIGS. 1A and 1B illustrate perspective views of a shrimp processing machine, wherein FIG. 1A illustrates a generalized view of the machine, and wherein FIG. 1B illustrates a more detailed view of the machine constructed in accordance with various embodiments of the present disclosure;

FIGS. 6A and 6B illustrate front and side elevation views, respectively, of cutting blades constructed in accordance with various embodiments of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, the present disclosure is directed to an at least semi-automatic shrimp processing machine that is capable of adjustably cutting and picking shrimp. The machine includes a number of adjustable knobs and other components to selectively cut the shrimp in a desired style (e.g., a 2-4 cut or a tail-on round cut). Further, the machine may be quickly adjusted to accommodate shrimp of varying sizes. An operator may quickly engage the adjustable knobs and other components and can quickly select desired processing settings.

Figure 1A:
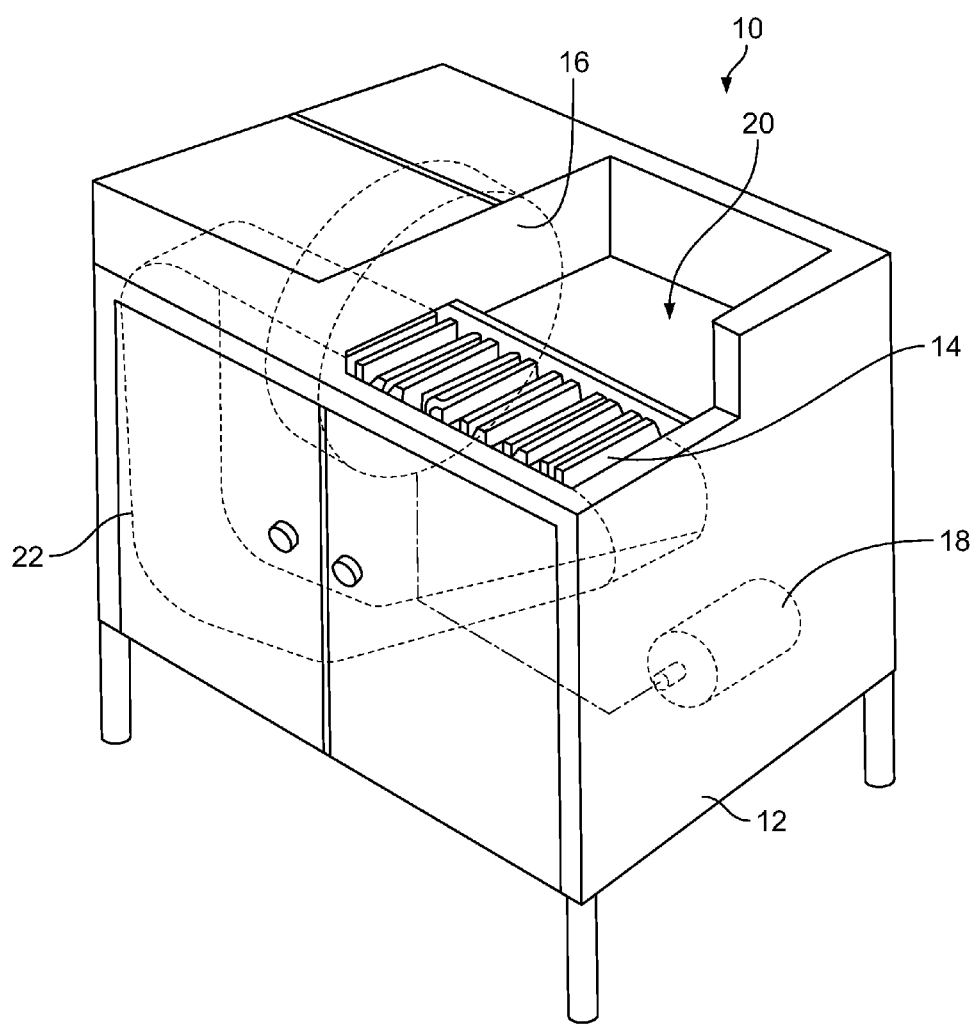
Figure 1B:
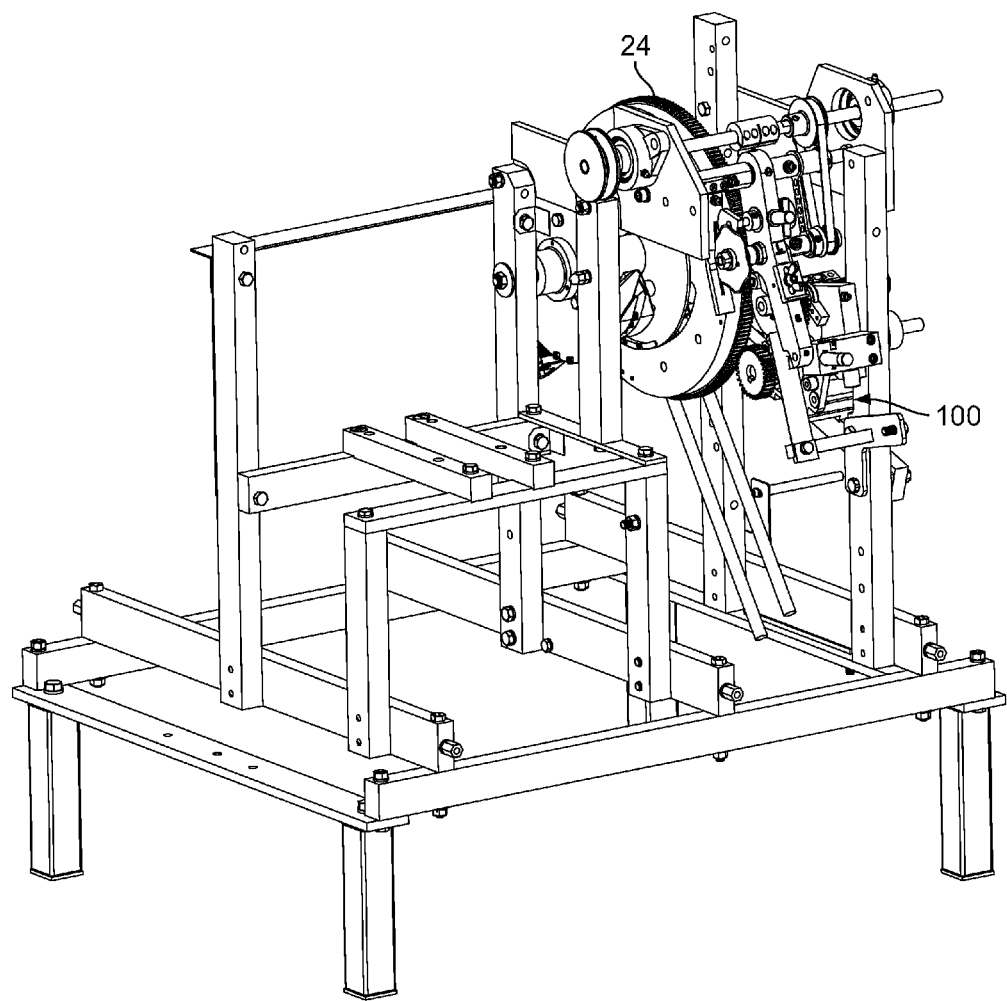
Figure 7A:
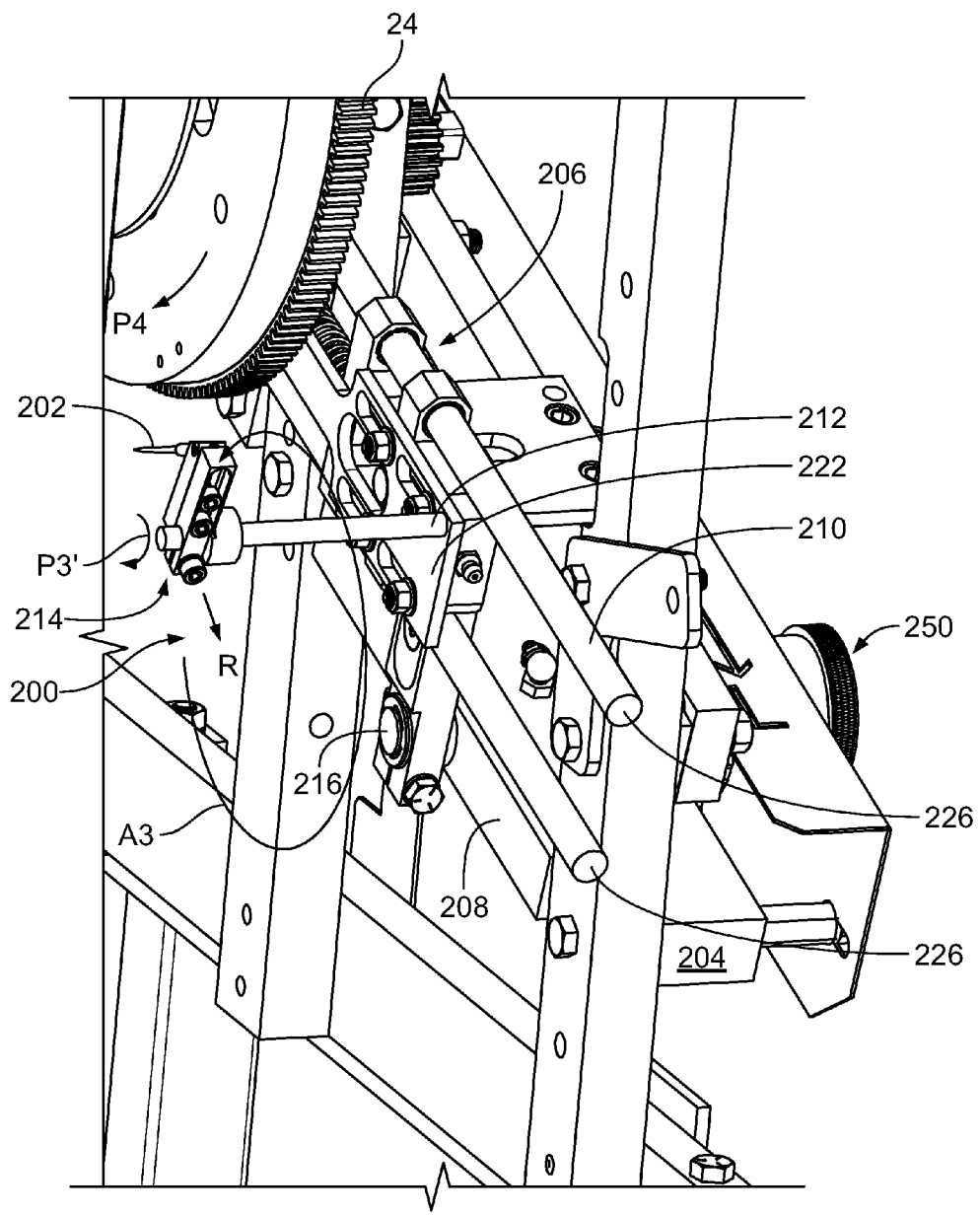
FIGS. 7A-7C illustrate perspective views of an adjustable meat picking timing system constructed in accordance with various embodiments of the present disclosure.

Referring now to the drawings, and in particular to FIGS. 1A, 1B, and 7A, a shrimp processing machine 10 is constructed in accordance with various embodiments of the present disclosure. The general construction and operation of the machine 10 can be similar to any of the machines disclosed in the commonly owned U.S. Pat. No. 2,850,761, filed on May 3, 1956, U.S. Pat. No. 3,214,789, filed on Jan. 28, 1963, U.S. Pat. No. 3,238,561, filed on Mar. 8, 1966, U.S. Pat. No. 3,247,542, filed on Apr. 26, 1966, U.S. Pat. No. 6,533,651, filed on Mar. 27, 2001, U.S. Pat. No. 6,485,363, filed on Mar. 27, 2001, and U.S. Pat. No. 7,867,067, filed on Mar. 12, 2009, the entire contents of each are expressly incorporated herein by reference. Specifically, the shrimp processing machine 10 includes a housing 12, a number of individual loading trays 14, a processing assembly 16 that includes an adjustable cutter assembly 100 (FIG. 1B) and an adjustable picking assembly 200 (FIG. 7A), and a motor 18. It is understood that the operation and construction of some of these systems is known, and thus will not be described in detail.

The housing 12 defines a hopper 20 for receiving unprocessed shrimp (not shown). The individual loading trays 14 are positioned on a conveyor 22 and move adjacent to the hopper 20. The motor 18 actuates the conveyor 22 and the processing assembly 16 such that during operation, shrimp carried on the loading trays are delivered to the processing assembly 16 for processing.

As shown in FIG. 1B, the processing assembly 16 includes a main gear 24, any number of individual shrimp clamp assemblies (e.g., between two and eight shrimp clamp assemblies, not shown), and a work station that includes the adjustable cutter assembly 100 and the adjustable picking assembly 200. It is understood that in some examples, any number of additional work stations arranged about the main gear 24 such as, for example, a cleaning station.

During operation, the main gear 24 moves in a rotational direction. As the main gear 24 rotates, the shrimp clamp assemblies pass from beneath the loading trays 14. As each clamp assembly passes a tray 14, the shrimp clamp assembly grasps the shrimp. With the shrimp loaded into a shrimp clamp assembly, continued rotation of the main gear 24 moves the shrimp toward the adjustable cutting assembly 100 and the adjustable picking assembly 200 for processing.

Turning to FIGS. 2A-2F, the adjustable cutter assembly 100 includes an adjustable drive assembly 102 including a drive gear 104 and an adjustable cutter shaft 110 coupled to the drive gear 104. The adjustable cutter assembly 100 further includes an adjustable roller plate 120 (FIG. 2B) disposed near a surface 105 of the drive gear 104, a cutter assembly 130, and a blade assembly 160. It is understood that the adjustable cutter assembly 100 can include any number of additional components and/or sub-systems that, for the sake of brevity, will not be described in greater detail.

The drive gear 104 includes a number of gear teeth 106 that are operatively engaged with the main gear 24. In some examples, the drive gear teeth 106 are adapted to directly mesh with teeth of the main gear 24 to cause rotation of the adjustable drive assembly 102. In other examples, any number of reduction gears or similar mechanisms may be used to operatively couple the drive gear 104 to the main gear 24. The drive gear 104 includes an opening 107 (FIG. 2D) through which the adjustable cutter shaft 110 is at least partially disposed. The adjustable cutter shaft 110 is adapted to selectively rotate with or rotate freely from the drive gear 104 using any number of known mechanisms and components. The drive gear 104 also includes a number of drive gear indicator or indicators 108 (FIGS. 2C, 2E, and 2F) in the form of pins or protrusions that are adapted to indicate a position of the adjustable roller plate 120 relative to the drive gear 104.

Figure 2A:
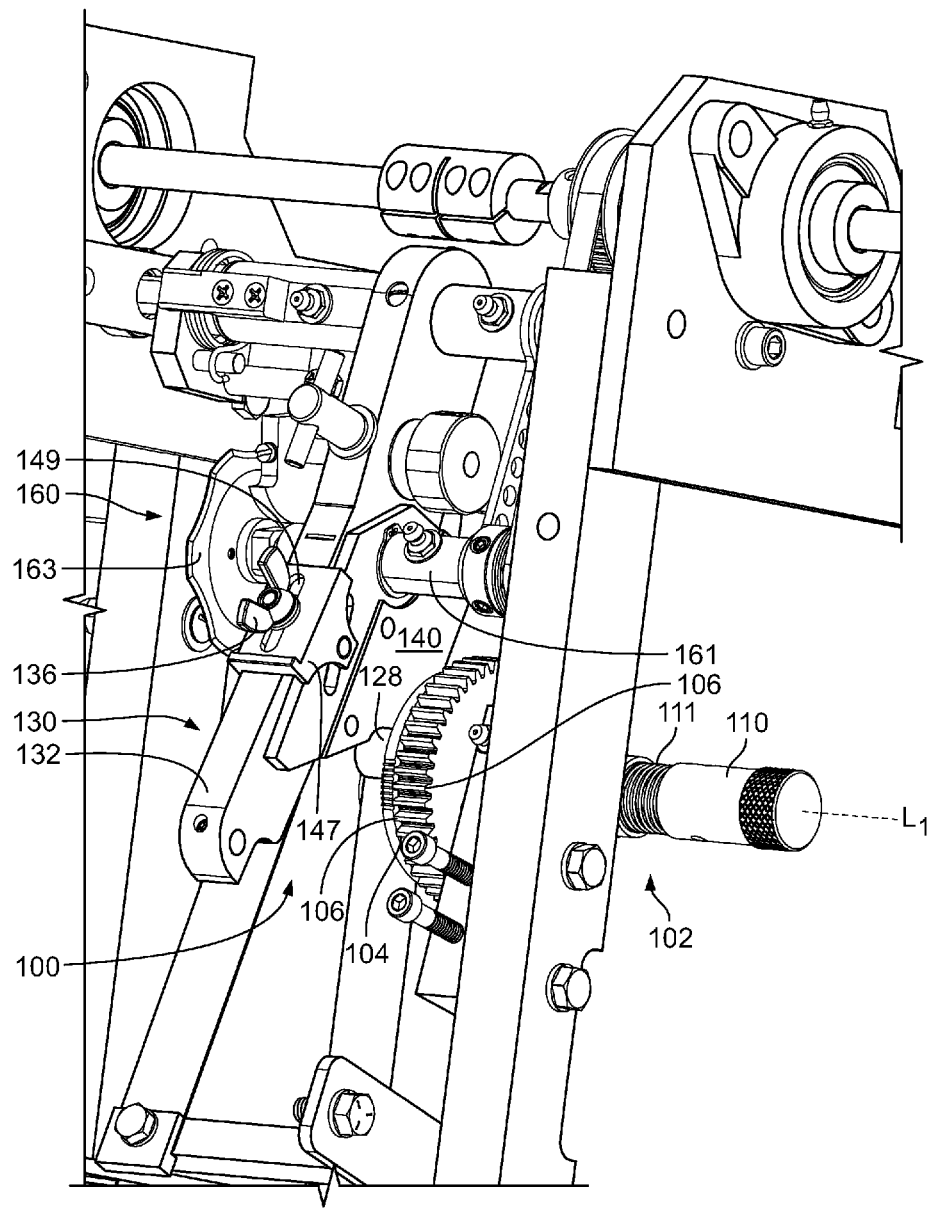
FIGS. 2A and 2B illustrate perspective views of an adjustable cutting assembly of the shrimp processing machine constructed in accordance with various embodiments of the present disclosure.
Figure 2B:
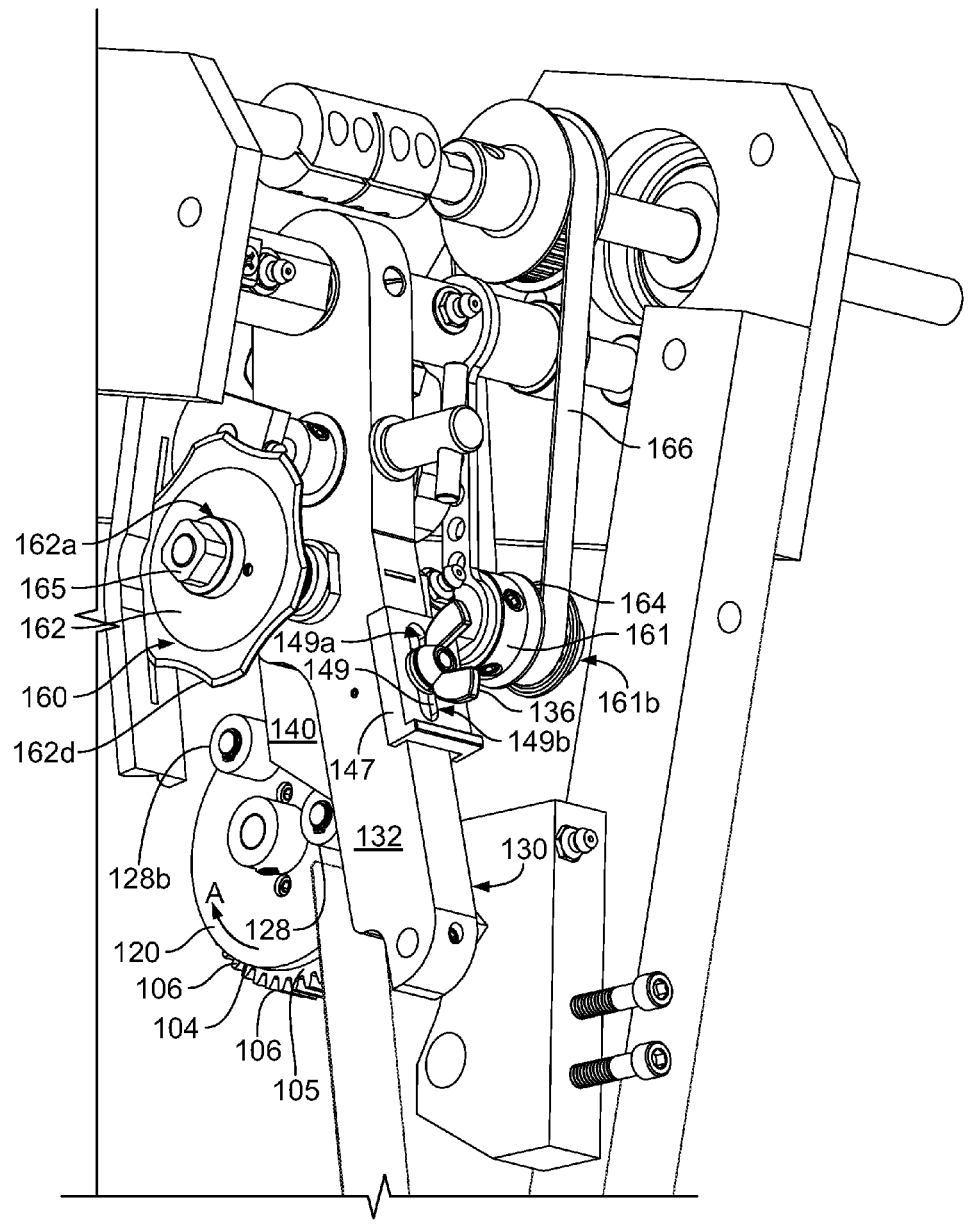
Figure 2C:
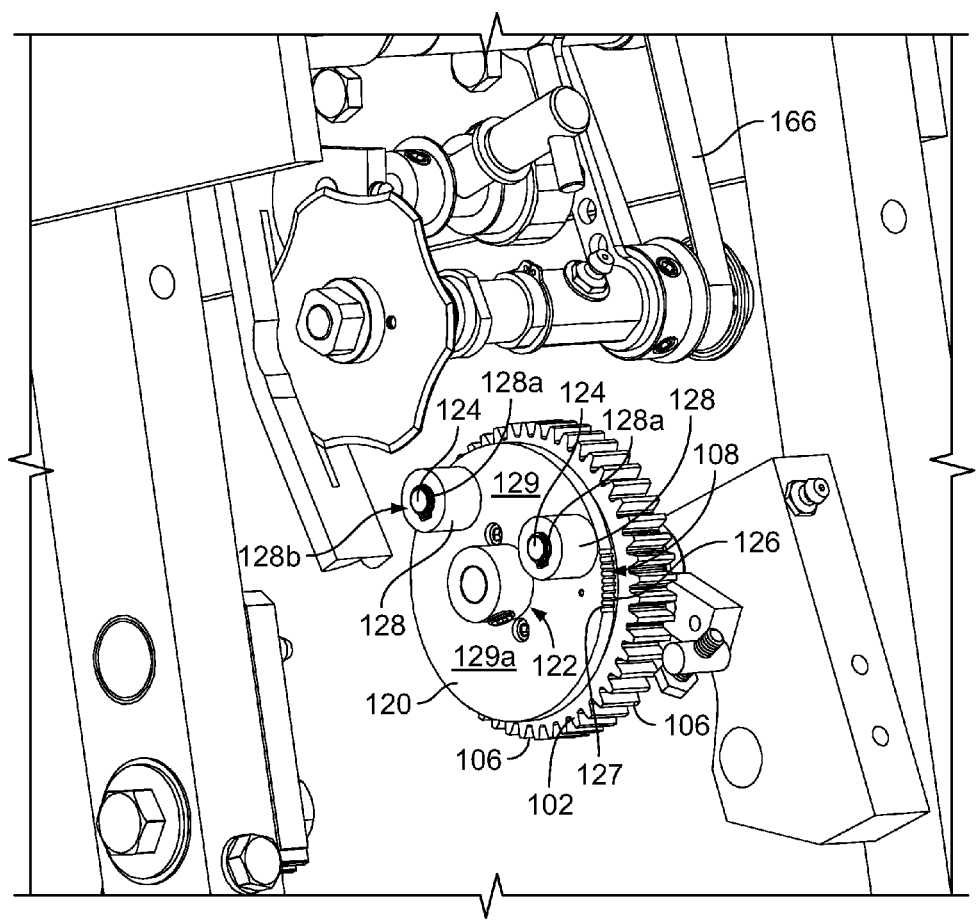
FIG. 2C illustrates an example adjustable roller plate of the adjustable cutting assembly of FIGS. 2A and 2B constructed in accordance with various embodiments of the present disclosure.
Figure 2D:
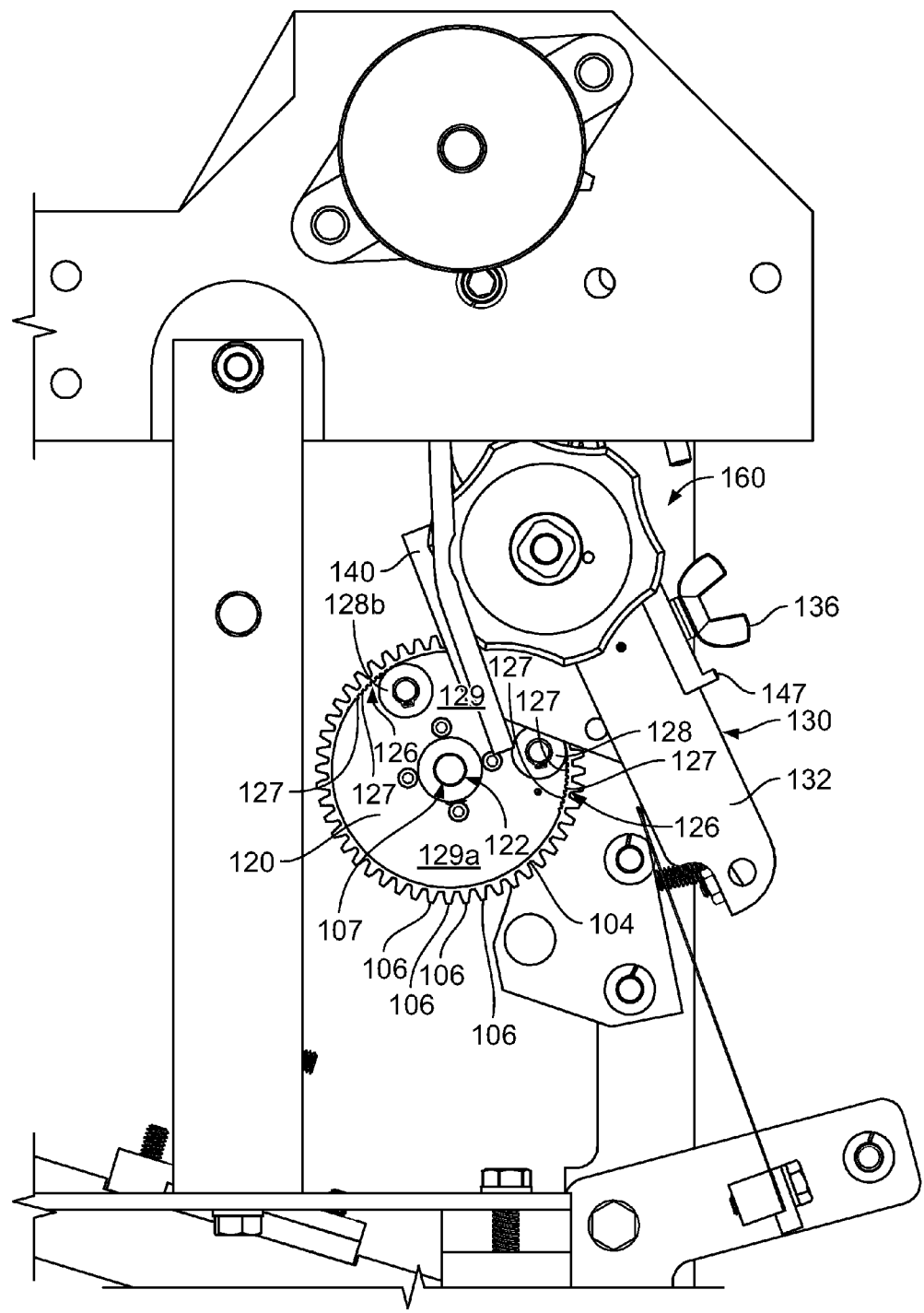
FIGS. 2D and 2E illustrate left side elevation views of the adjustable cutting assembly of FIGS. 2A-2C, with FIG. 2D illustrating an adjustable cam plate assembly of the adjustable cutting assembly of FIGS. 2A and 2B, and with FIG. 2E illustrating the adjustable roller plate of FIG. 2C adjusted in a first configuration in accordance with various embodiments of the present disclosure.
Figure 2E:
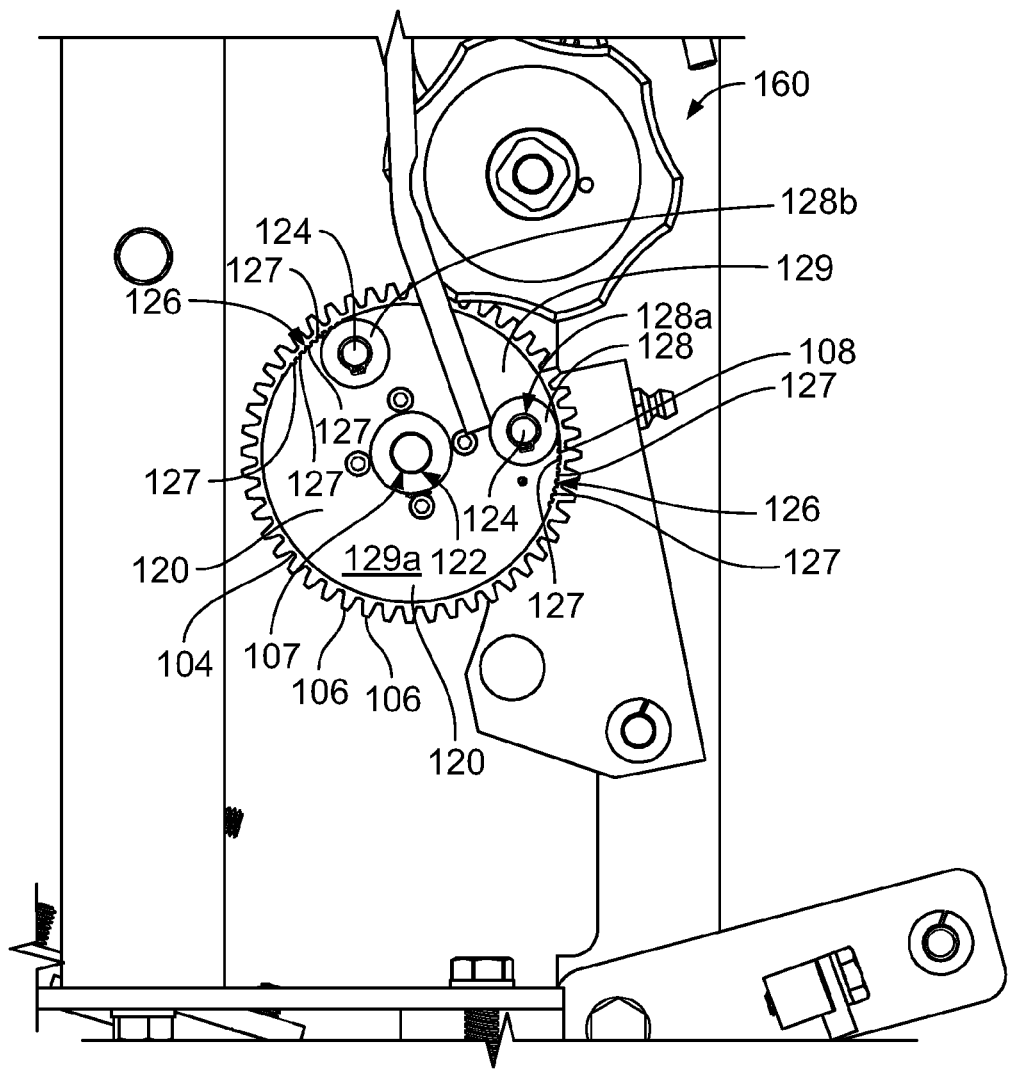

As shown in FIG. 2C, the adjustable roller plate 120 includes an opening 122, a number of protrusions 124, and a number of grooved regions 126. The opening 122 is dimensioned to receive and secure to a portion of the adjustable cutter shaft 110 via any number of known approaches. The number of protrusions 124 are adapted to couple to rollers 128, 128*b* having openings 128*a*. In the illustrated examples, each of the rollers 128, 128*b* is generally cylindrical in shape, but it is understood that any desired shape and/or configuration can be used. Further, in the illustrated example, there are two protrusions 124, but it is understood that any number of protrusions 124 may be used to couple to any number of rollers 128. The grooved regions 126 each include a number of grooves or indentations 127. These grooved regions 126 are adapted to indicate and adjust the position of the adjustable roller plate 120 relative to the drive gear 104. In the illustrated example, there are two grooved regions 126, each of which includes nine grooves 127, but it is understood that any number of grooved regions 126 and grooves 127 may be used. The protrusions 124 are disposed at an angle other than 180° from each-other, and thus they define two empty areas 129, 129*a* that are differently dimensioned.

Generally speaking, by rotating the adjustable cutter shaft 110, the adjustable roller plate 120 can be positioned in a number of configurations (e.g., the configurations illustrated in FIGS. 2E and 2F) relative to the drive gear 104 in order to adjust the location of the rollers 128. Specifically, in some examples, the adjustable cutter shaft 110 may be tensioned or urged in a "locked" position or configuration via a spring 111 (as shown in FIG. 2A) or other tensioning device. In this locked configuration, each drive gear indicator 108 can be used to indicate relative positioning of the adjustable roller plate 120 by being disposed near a particular groove 127 in each grooved region 126. It is understood that in some examples, the assembly 102 only includes one drive gear indicator 108, thus the single drive gear indicator will indicate relative positioning of the adjustable roller plate via a groove 127 in a groove region 126.

Figure 2F:
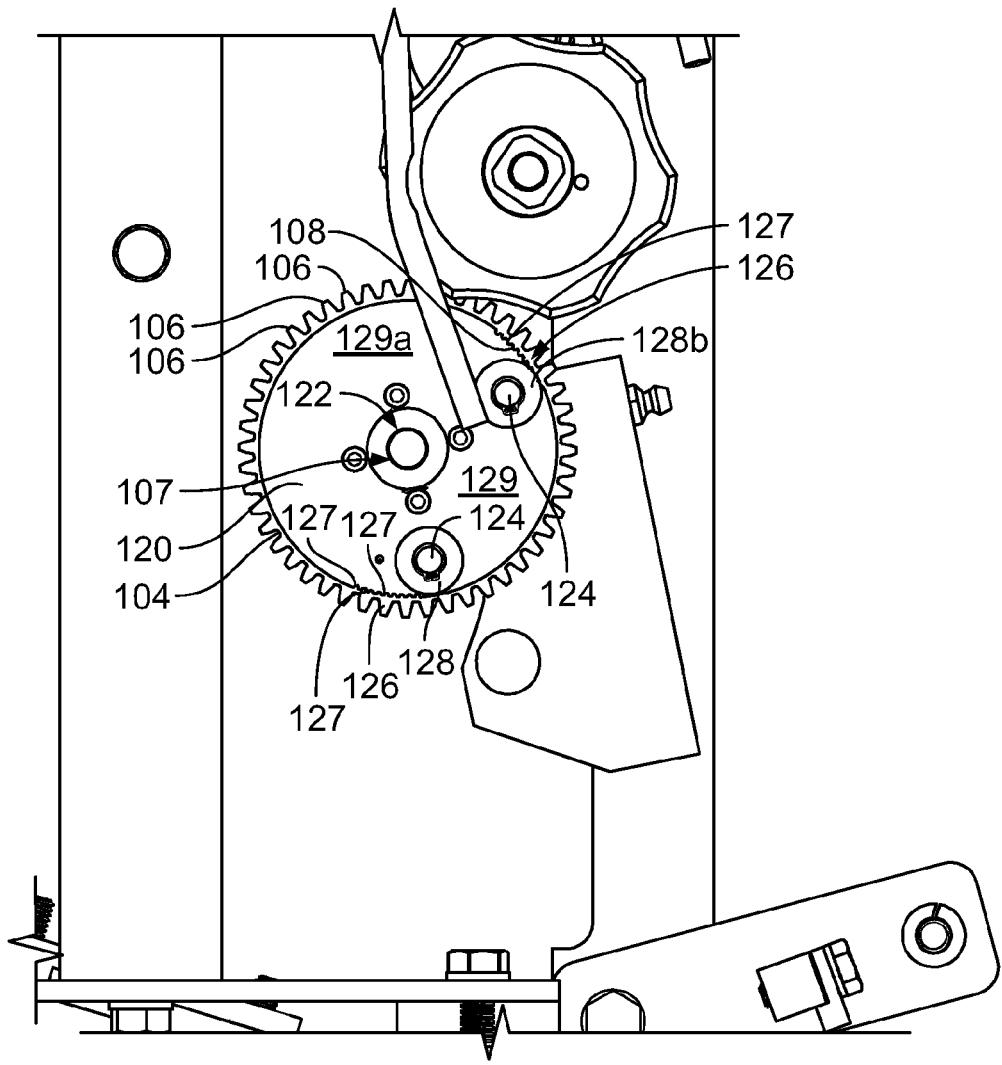
FIG. 2F illustrates a left side elevation view of the adjustable cutting assembly of FIGS. 2A-2C, wherein the adjustable roller plate is adjusted to a second configuration in accordance with various embodiments of the present disclosure.

The adjustable roller plate 120 can be selectively released from and coupled to the drive gear 104 (to allow the adjustable roller plate to selectively rotate without or with the drive gear, respectively) using any number of known approaches. In one example, the adjustable roller plate 120 can be coupled to the drive gear 104 via an opening (not shown) having a shape that corresponds to a protrusion on the drive gear 104 (not shown). By urging the adjustable cutter shaft 110 (e.g., by pushing it along an axis $L_1$ illustrated in FIG. 2A), the adjustable roller plate 120 is moved to an uncoupled or "unlocked" position where the drive gear 104 is not mated with the adjustable roller plate 120. In this unlocked position, the adjustable cutter shaft 110 can be rotated so any of the grooves 127 and/or grooved regions 126 can be aligned with the drive gear indicator or indicators 108. Upon aligning the drive gear indicator or indicators 108 with the desired groove 127 and/or grooved region 126, the adjustable cutter shaft 110 can be released, whereupon the urging force from the spring 111 causes the adjustable cutter shaft 110 (and thus the adjustable roller plate 120) to move to the locked configuration. As a result, and as illustrated in FIG. 2F, the rollers 128, 128*b* are located in a different configuration that causes the shrimp to be cut in a different style (as will be described in further detail below).

Figure 3A:
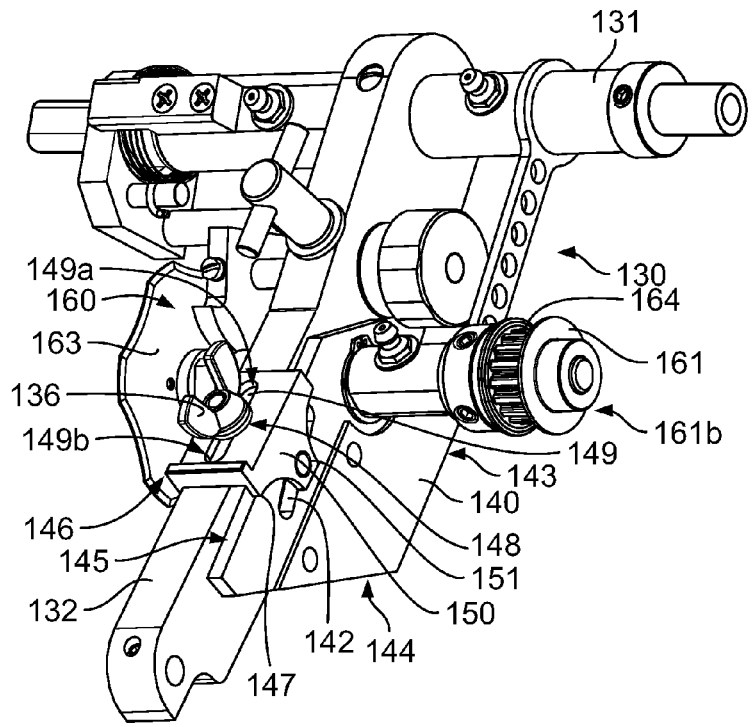
FIGS. 3A and 3B illustrate perspective views of the adjustable cam plate assembly of the adjustable cutting assembly constructed in accordance with various embodiments of the present disclosure.
Figure 3B:
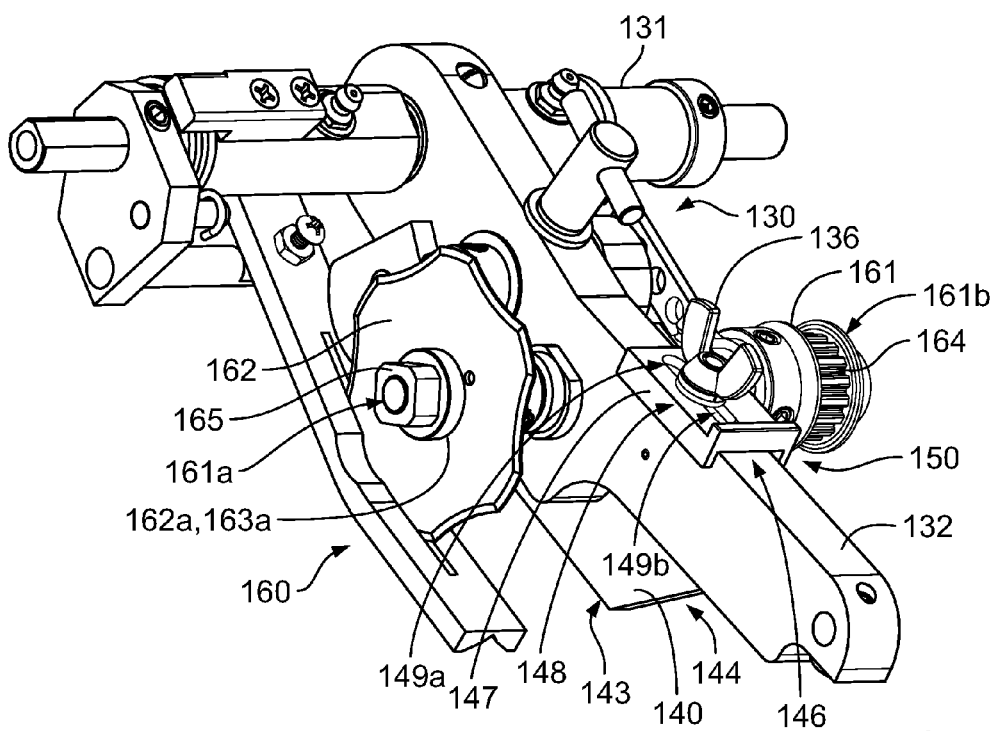
Figure 4:
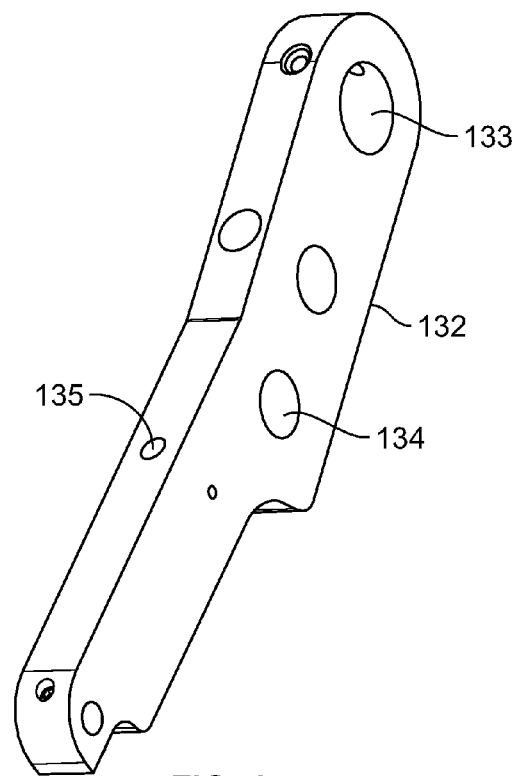
FIG. 4 illustrates a perspective view of an example cutter bar constructed in accordance with various embodiments of the present disclosure.

Turning to FIGS. 3A-5, the cutter assembly 130 is also adjustable and includes cutter mount 131, a cutter bar 132, and a cam plate 140. As illustrated in FIG. 4, the cutter bar 132 includes a first opening 133, a second opening 134, and a third opening 135. The first opening 133 is adapted to receive the cutter mount 131 to allow the cutter bar 132 to pivot about the cutter mount 131. The second opening 134 is adapted to receive a blade drive rod 161 (illustrated in FIGS. 3A and 3B) that supports the cam plate 140 and the blade assembly 160. The third opening is adapted to receive an adjustment nut 136 (illustrated in FIGS. 3A and 3B) to adjustably couple the cam plate 140 relative to the cutter bar 132.

Figure 5:
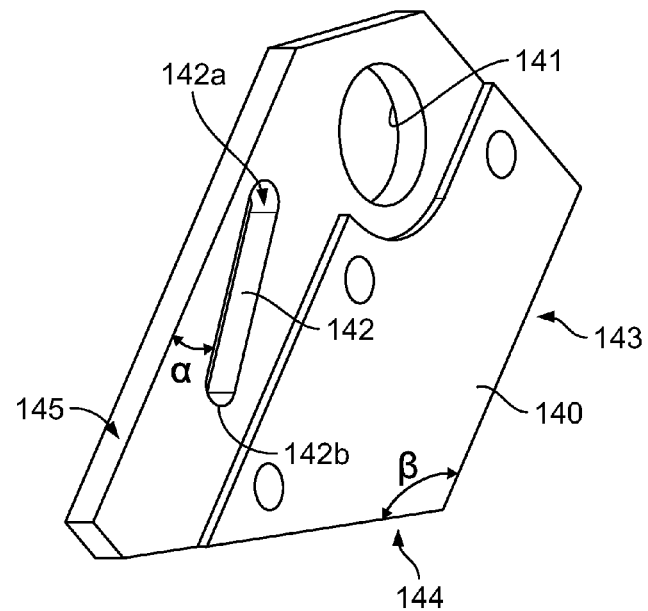
FIG. 5 illustrates a perspective view of an example cam plate constructed in accordance with various embodiments of the present disclosure.

As illustrated in FIG. 5, the cam plate 140 includes an opening 141, a slot 142 having a first end 142*a* and a second end 142*b*, a first contact surface 143, a second contact surface 144, and an upper surface 145. The opening 141 is adapted to receive the blade drive rod 161 illustrated in FIGS. 3A and 3B that drives the blade assembly 160. Accordingly, the cam plate 140 is adapted to pivot about the blade drive rod 161 and relative to the cutter bar 132. The slot 142 is angled relative to the upper surface 145 of the cam plate 140 (denoted as "α" in FIG. 5). In the illustrated example, this angle α is approximately 30°, but it is understood that other angles are possible. The second surface 144 is angled relative to the first surface 143 (denoted as "β" in FIG. 5). In the illustrated example, this angle β is approximately 135°, but it is understood that other angles are possible.

As shown in FIGS. 3A and 3B, a cam adjuster assembly 146 includes a generally L- or U-shaped adjuster bracket 147 having a slot 149 disposed through a first side 148 and a pin 151 (FIG. 3A) disposed on a second side 150. The cam adjuster assembly 146 further includes the adjustment nut 136 that allows the cam plate 140 to be adjusted relative to the cutter bar 132.

The pin 151 is adapted to be inserted into the slot 142 of the cam plate 140 to slidably couple the cam plate 140 to the cutter bar 132. By loosening the adjustment nut 136, the adjuster bracket 147 is movable to any position between a first end 149*a* and a second end 149*b* of the adjuster bracket slot 149. This movement of the bracket 147 in turn causes the pin 151 to travel between the first end 142*a* and a second end 142*b* of the cam plate slot 142.

Because the cam plate 140 is pivotally coupled to the blade drive rod 161, movement of the adjuster bracket 147 causes the cam plate 140 to be rotatably positioned at different locations. The adjustment nut 136 can then be tightened to secure the adjuster bracket 147 (and thus the cam plate 140) at a desired position. As will be described in greater detail, adjusting the adjuster bracket 147 alters the angle of the first and the second surfaces 143, 144 of the cam plate 140, which in turn modifies a dwell time of the blade assembly 160, thereby altering the cut time and depth.

As illustrated in FIGS. 2A, 2B, 3A and 3B, the blade assembly 160 includes the blade drive rod 161, a first blade 162 (FIGS. 2B and 3B), a second blade 163 FIGS. 2A and 3A), and a blade drive gear 164 (FIGS. 2B-3B). The first and the second blades 162, 163 include openings 162*a*, 163*a* (FIG. 3B), respectively, that are concentrically aligned and dimensioned to receive a first end 161*a* (FIG. 3B) of the blade drive rod 161 to secure the blades 162, 163 thereto using any number of components (e.g., nut 165 illustrated in FIGS. 2B and 3B, clamps, and the like). The blade drive gear 164 is disposed on a second end 161*b* (illustrated in FIGS. 2B-3B) of the blade drive rod 161 and is rotatably driven (e.g., via blade drive belt 166 shown in FIG. 2B) to cause the blades 162, 163 to rotate and cut the shrimp. It is understood that any number of additional components may be used in the blade assembly 160 such as blade guides, safety devices, and the like.

As illustrated in FIGS. 6A and 6B, the blades 162, 163 include a number of curved segments 162b, 162c. It will be understood that blade 163 includes similar features as those illustrated in the blade 162 of FIG. 6A. The segments 162b, 162c intersect to form a cutting edge 162d. The opening 162a is hex-shaped to allow the first blade 162 and the second blade 163 to be aligned. The blades 162, 163 are spaced a distance (denoted by "L" in FIG. 6B) apart to create a partial vacuum when cutting the shrimp. In some examples, the blades are spaced approximately 0.020 mm apart. It is understood that the distance L can be increased or decreased as desired. In some examples, the first blade 162 and the second blade 163 are separated by a spacer having a desired thickness to ensure the distance L is maintained. The vacuum generated by the rotating blades 162, 163 causes the vein of the shrimp to be effectively removed from the shrimp during the cutting process.

Because the cam plate 140, the cutter bar 132, and the blade assembly 160 are all coupled to each-other, movement of one of these components causes all of the components to pivot about the cutter mount 131. In operation, as the drive gear 104 rotates in a clockwise direction denoted by arrow "A" in FIG. 2B, the adjustable roller plate 120, and thus the rollers 128, 128b also rotate in a clockwise direction about axis $L_1$. The rollers 128, 128b are positioned to contact the first surface 143 of the cam plate 140 and rotatably urge the cam plate 140 (and thus the blade assembly 160) upwards about the cutter mount 131. The first roller 128 then travels along the first surface 143 of the cam plate 140 to the second surface 144 of the cam plate 140. Upon the first roller 128 contacting the second surface 144 of the cam plate 140, the cam plate 140 (and thus the blade assembly 160) rotates downwardly about the cutter mount 131 and drops into the empty area 129 of the adjustable roller plate 120.

At the same time, a shrimp disposed in a shrimp clamp assembly moves into proximity of the blade assembly 160. As the cam plate 140 occupies the empty area 129 of the adjustable roller plate 120, the blades 162, 163 cut the shrimp along a dorsal side. As the adjustable roller plate 120 continues to rotate, the second roller 128b contacts the first surface 143 of the cam plate 140, which causes the cam plate 140 (and thus the blade assembly 160) to rotate upwards and away from the shrimp, thus causing the cut to be completed. At this time, the cut shrimp moves along the processing assembly 16 to a different assembly (e.g., the picking assembly 200).

As previously mentioned, the adjustable cutter assembly 100 can be adjusted in a number of ways. By adjusting the adjustable roller plate 120 to the configuration depicted in FIG. 2F (i.e., the second configuration), as the adjustable roller plate 120 rotates in a clockwise direction, after the second roller 128b is the first roller to contact the first surface 143 of the cam plate 140. Accordingly, the cam plate 140 drops into the larger empty void area 129a. Accordingly, the blade assembly 160 remains in contact with the shrimp for a longer time, thereby causing the cut in the shrimp to be longer in order to create a tail-on style cut. The drop-in time can be modified on a finer scale by coupling the drive gear indicator or indicators 108 to a particular groove 127 of a desired grooved region 126. Each groove 127 causes the cam plate 140 to drop into the empty areas 129, 129a between rollers 128, 128b at different times, thus modifying the overall dwell time of the cam plate 140 (and thus the blade assembly 160).

The cutter assembly 130 can be adjusted to modify the depth of the cut. As the adjuster bracket 147 is moved, the angle of the second surface 144 is also moved. As previously described, upon the second surface 144 contacting the roller 128, the cam plate 140 (and thus the blade assembly 160) begin to drop into the empty area 129 or 129a between rollers 128, 128b to cut the shrimp. Adjusting the angle of the second surface 144 adjusts the drop-in rate of the cam plate 140 into the empty area 129 or 129a. A steeper angle (i.e., when the pin 151 is positioned near the first end 142a of the slot 142) causes the cam plate 140 to drop in faster to cut the shrimp. Accordingly, the second roller 128b makes contact with the cam plate 140 sooner to push the cam plate 140 (and thus the blade assembly 160) away from the shrimp, thus effectively making the cut shorter because the dwell time for cutting is decreased. As the second roller 128b contacts the second surface 144 of the cam plate, the shrimp has safely passed the cutting blades 162, 163.

Adjusting the adjuster bracket 147 downwards (i.e., disposing the adjustment nut 136 near the first side 149a of the slot 149) causes the cam plate 140 (and thus the blade assembly 160) to move toward the area where the shrimp are cut. Such a configuration accommodates smaller sizes of shrimp because the blades 162, 163 cut deeper. Conversely, adjusting the adjuster bracket 147 upwards (i.e., disposing the adjustment nut 136 near the second side 149b of the slot 149) causes the cam plate 140 (and thus the blade assembly 160) to move away from the area where the shrimp are cut. Such a configuration accommodates larger sizes of shrimp because the blades 162, 163 cut shallower.

To summarize, moving the cam plate 140 via the cam adjuster assembly 146 alters the drop-in rate of the blade assembly 160 and also positions the blade distance according to the shrimp size being processed. This allows the cut length and depth to be adjusted as desired. Further, moving the adjustable roller plate 120 between configurations allows the cut style to be selected.

Figure 7B:
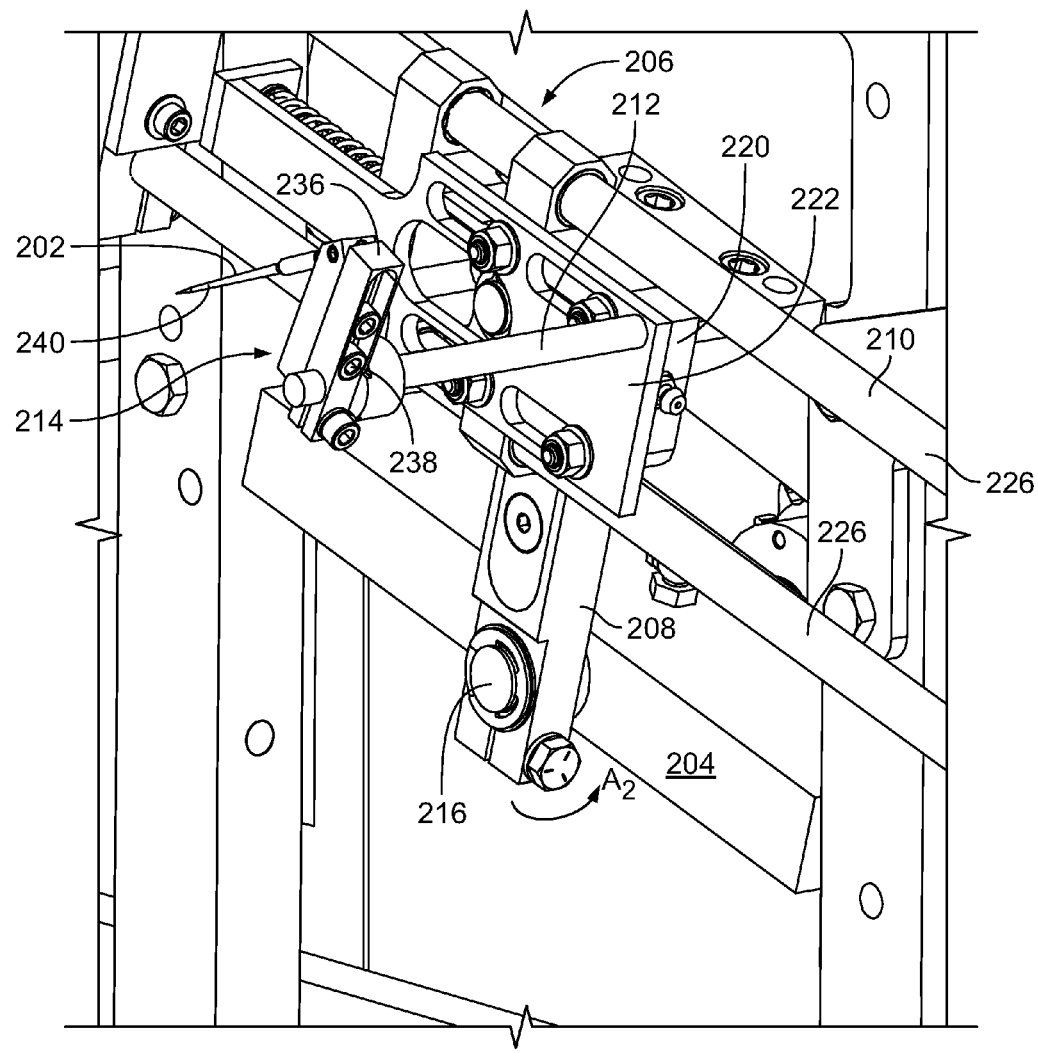
Figure 7C:
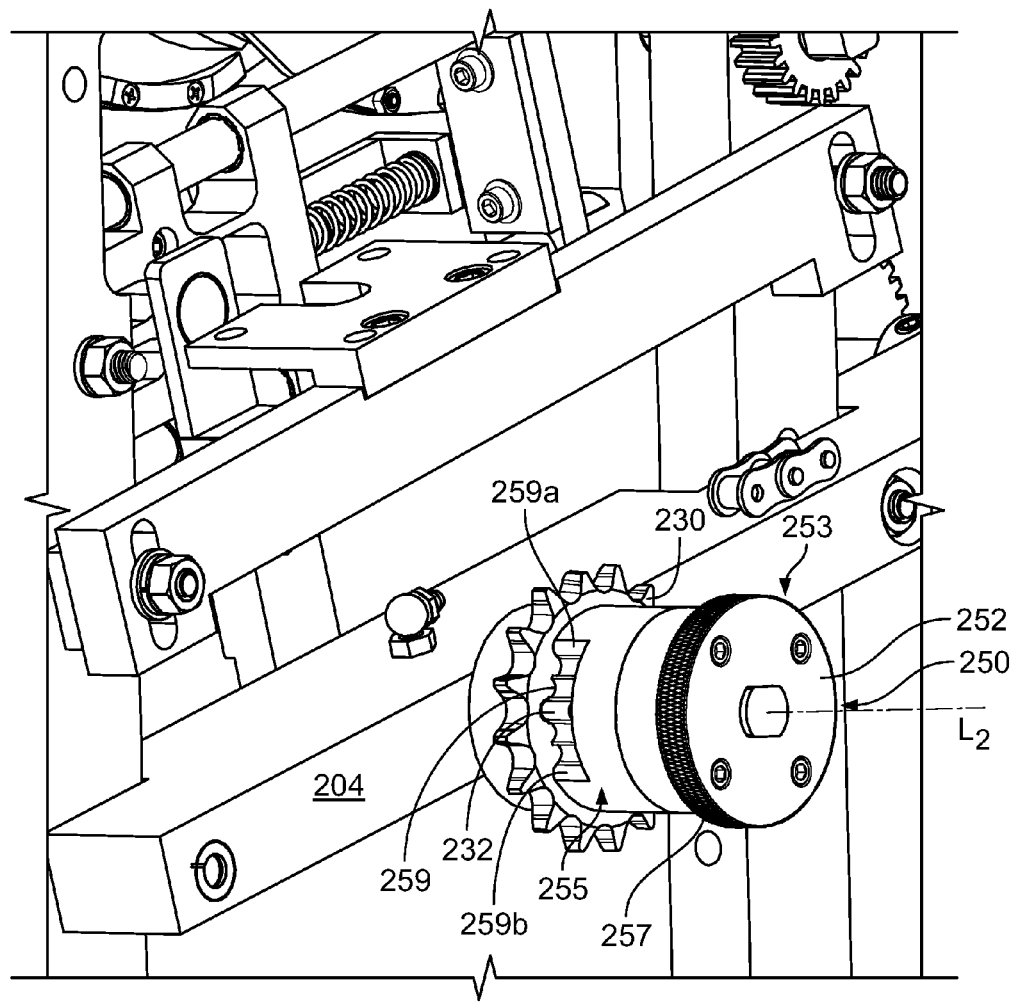

Turning to FIGS. 7A-7C, the adjustable picking assembly 200 includes an oscillating fork 202 adapted to longitudinally penetrate the shrimp meat at a location previously occupied by the shrimp head, i.e., the head region, and remove the shrimp meat from the shrimp shell in a direction R that is generally perpendicular to the dorsal side of the shrimp. A detailed explanation of the mechanics and operation of one such picker assembly 200 is described in U.S. Pat. No. 7,867,067, filed on Mar. 12, 2009, the entire contents of which are expressly incorporated herein by reference. The picker assembly 200 includes the fork 202, an actuator assembly 204, and a drive linkage 206. The actuator assembly 204 drives the drive linkage 206 and moves the fork 202 around a modified circular path P3 illustrated in FIG. 7A in a direction illustrated by the arrow A3. During movement, the fork 202 occupies generally the same orientation at all positions along the path P3.

As illustrated in FIGS. 7A and 7B, in some examples, the actuator assembly 204 can include, for example, an electric motor. The drive linkage 206 includes a crank arm 208, a rack 210, and a slide assembly 212. A first end of the driven arm 208 is attached to an output shaft 216 of the actuator assembly 204 and adapted to rotate counter-clockwise (i.e., in the direction of arrow A2 in FIG. 7B). A second end of the driven arm 208 is operably coupled to the slide assembly 212 and rack 210. As illustrated in FIG. 7C, the output shaft 216 can include a gear 230 that rotatably drives the driven arm 208. The rack 210 includes a pair of elongate guide rods 226 connected at one end by an end plate attached to a pivot pin (not shown) which is coupled to a fixed component which may form part of the housing 12 of the shrimp processing machine 10.

As best illustrated in FIG. 7B, the picker arm 214 includes a connector 236 and the fork 202. In the disclosed embodiment, the fork 202 includes a single tine 240 fixedly connected to and extending away from the connector 236. The single tine 240 is slightly curved to facilitate picking of the shrimp meat. In the disclosed embodiment, the tine 240 is curved such that it bends with the natural contour of the shrimp meat. Other embodiments could be arranged differently. The connector 236 may include one or more set screws 238 for releasably securing the single tine 240 thereto. As such, the single tine 240 can be interchanged with one or more different tines having different curvatures, or no curvature at all, to accommodate different processing operations. In yet further embodiments, the fork 202 can include multiple tines if desired.

With the adjustable picker assembly 200 configured as described, and as mentioned above, the single tine 240 is adapted to penetrate the shrimp meat and remove it from the shrimp shell in a direction R that is generally perpendicular to the dorsal side of the shrimp. More specifically, during operation, the main gear 24, the clamp assemblies, and the shrimp meat carried by the clamp assemblies move along a circular path P4 in a direction as indicated in FIG. 7A. The circular path P4 occupied by the clamp assemblies is disposed adjacent to the circular path P3 occupied by the movement of the fork 202 of the adjustable picker assembly 200 to effectuate removal of the shrimp meat from the shell. Moreover, the direction of movement of the clamp assemblies along the circular path P4 is opposite to the direction of movement of the fork along its respective circular path P3.

During operation, the actuator assembly 204 drives the driven arm 208 along its direction of movement A2, which causes the sliding assembly 212 to slide back and forth on the rack 210 and rotate in a circular path that is generally similar to the circular path P3 of the fork 202. This also causes the rack 210 to pivot in an oscillating fashion relative to the pivot pin. The rotational motion of the sliding assembly 212 transfers to the fork 202 such that the fork 202 cyclically interacts with the main gear 24 and clamp assemblies to pick the shrimp meat from the shrimp shell.

As the fork 202 and clamp assemblies move along their respective circular paths P3, P4, the single tine 240 can enter the head region of the shrimp and penetrate the shrimp meat along the longitudinal direction of the shrimp. To facilitate this penetration, the circular path P3 of the fork 202 includes a hitch portion P3' (illustrated in FIG. 7A) at a location adjacent to the circular path P4 of the clamp assemblies. The hitch portion P3' of the circular path P3 includes a shape and direction that is different from the remainder of the circular path P3 of the fork 202. As the fork 202 travels through the hitch portion P3', it travels at a fixed distance relative to an axis point that is different from a first axis point that the fork 202 travels at a fixed distance from through the circular path P3. In the present embodiment, the second axis point can be positioned at the rotational axis of the main gear 24 and clamp assemblies. Therefore, during the brief time period that the tine 240 of the fork 202 penetrates the shrimp meat, the tine 240 and the shrimp meat carried by the clamp assembly are traveling on substantially identical arcuate paths, i.e., an arcuate path indicated by the hitch portion P3'.

As more clearly illustrated in FIG. 7C, an end of the output shaft 216 includes a picker adjuster assembly 250. The picker adjuster assembly includes an adjuster knob 252 that includes a first end 253 and a second end 255. A gripping portion 257 is disposed on the first end 253. A number of grooves 259 are disposed on the second end 255. The grooves 259 are dimensioned to mate with a protrusion 232 located on a side of the gear 230 to couple the adjuster knob 252 to the gear 230. The picker adjuster assembly 250 may also include a biasing device (not shown) such as a spring or other tensioner. This biasing device causes the picker adjuster assembly 250 to be urged in a "locked" configuration in which the protrusion 232 is mated with one of the grooves 259.

By urging or pulling the picker adjuster assembly 250 outwards (i.e., away from the gear 230) via the gripping portion 257, the adjuster knob 252 becomes uncoupled from the gear 230. At this point, the picker adjuster assembly 250 can be rotated so any of the grooves 259 can be mated with the protrusion 232. Upon aligning the protrusion 232 with the desired groove 259, the adjuster knob 252 can be released, whereupon the urging force from the spring causes the adjustable knob 252 to move to the locked configuration.

The picker adjuster assembly 250 is rotatably coupled to the output shaft 216 such that rotation of the picker adjuster assembly 250 causes the output shaft 216 to rotate. When the adjuster knob 252 is in an unlocked configuration, rotating the adjuster knob 252 still causes the output shaft 216 to rotate. This rotation in turn causes the crank arm 208 to rotate about a pivot (i.e., the longitudinal axis $L_2$ of the output shaft 216). This rotation causes the location and angle of the single tine 240 to adjust. In other words, rotating the adjuster knob 252 causes the single tine 240 to approach the clamp holding the shrimp at different areas or locations of the clamp, thus allowing for on-the-fly adjustability for different-sized shrimp.

By adjusting the adjuster knob 252 so the protrusion 232 is disposed on a rightmost groove 259a, the individual tine 240 will contact the shrimp body disposed on the clamp at a later time along the modified circular path P3, which can accommodate for the processing of larger shrimp. Conversely, by adjusting the adjuster knob 252 so the protrusion 232 is disposed on a leftmost groove 259b, the individual tine 240 will contact the shrimp body disposed on the clamp at an earlier time along the modified circular path P3, which can accommodate for the processing of smaller shrimp. So configured, the individual tine 240 longitudinally penetrates the shrimp meat from its head region and removes the meat from the shell in a direction that is generally perpendicular to the dorsal side of the shrimp and ensures that the dorsal and side portions of the shrimp meat remain essentially unblemished, thereby advantageously maximizing the aesthetic appeal of the final shrimp meat product.

In accordance with the foregoing, a unique shrimp processing machine is efficiently adjustable to accommodate cutting and pick shrimp having different sizes. Additionally, different cut styles may be quickly selected, which in turn provide a more capable machine. The adjustable nature of the machine can reduce processing times by requiring minimal effort to adjust the machine in a desired manner.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. §112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A cutting assembly for a shrimp processing machine, the cutting assembly comprising:
   a cutter drive assembly including a drive gear coupled to an adjustable drive shaft;
   an adjustable roller plate coupled to the adjustable drive shaft and disposed adjacent to the drive gear, the adjustable roller plate including a roller coupling portion adapted to secure a plurality of rollers and a roller adjusting portion adapted to rotatably adjust a position of the adjustable roller plate between at least a first position and a second position relative to the drive gear;
   a cam plate having a first end and a second end, the cam plate being pivotally supported at the first end and being adapted to contact the plurality of rollers to cause rotation about the first end of the cam plate; and
   a cutting device adapted to cut a shrimp, the cutting device being coupled to the cam plate;
   wherein upon contacting a first roller of the plurality of rollers, the cam plate is adapted to lower to a position that causes the cutting device to cut the shrimp, and upon contacting a second roller of the plurality of rollers, the cam plate is adapted to raise to a position that moves the cutting device away from the shrimp, wherein when the adjustable roller plate is disposed in the first position, the cutting device is adapted to contact and cut the shrimp for a first amount of time, wherein upon rotatably adjusting the position of the adjustable roller plate to the second position, the cutting device is adapted to contact and cut the shrimp for a second amount of time.

2. The cutting assembly of claim 1, wherein the roller adjusting portion of the adjustable roller plate comprises at least one indentation region having a plurality of indentations, wherein the drive gear includes a protrusion adapted to mate with any indentation of the at least one indentation region to adjust the position of the adjustable roller plate between the first position and the second position relative to the drive gear.

3. The cutting assembly of claim 1, wherein the first amount of time is sufficient to form a 2-4 style cut on the shrimp.

4. The cutting assembly of claim 1, wherein the second amount of time is sufficient to form a tail-on round style cut on the shrimp.

5. The cutting assembly of claim 1, wherein the cutting device comprises a blade assembly including a first blade and a second blade, each of the first blade and the second blade having an outer cutting edge, wherein the outer cutting edge of the first blade is spaced from the outer cutting edge of the second blade.

6. The adjustable cutting assembly of claim 5, wherein each of the plurality of blades includes a polygonal opening adapted to align the outer cutting edge of the first blade with the outer cutting edge of the second blade.

7. An adjustable cutting assembly for a shrimp processing machine, the adjustable cutting assembly comprising:
   a cam plate comprising a first end, a second end, and an angled contact surface;
   a cutting device coupled to the cam plate adapted to cut a shrimp;
   a cutter bar adapted to be coupled to the cam plate and the cutting device, the cutter bar including a first end coupled to a shaft and a second end adapted to pivotally rotate about the shaft thereby causing the cam plate and the cutting device to pivotally rotate about the shaft; and
   a cam adjusting assembly adapted to be coupled to the cam plate and the cutter bar, wherein the cam adjusting assembly is adapted to be adjustably moved between a first position and a second position;
   wherein upon adjusting the cam adjusting assembly between the first position and the second position, the angled contact surface of the cam plate is adapted to move relative to the cutter bar thereby selectively adjusting a cut depth on the shrimp performed by the cutting device.

8. The adjustable cutting assembly of claim 7, wherein the cam adjusting assembly comprises:
   an adjuster bracket including a pin adapted to insertably couple to a slot disposed on the cam plate and a slot; and
   a locking mechanism adapted to secure the adjuster bracket to the cutter bar, the locking mechanism including a protrusion adapted to insert into the adjuster bracket slot and couple to the cutter bar.

9. The adjustable cutting assembly of claim 8, wherein the locking mechanism comprises a wing nut assembly.

10. The adjustable cutting assembly of claim 7, further comprising an adjustable roller plate including a plurality of rollers adapted to contact the angled contact surface of the cam plate, wherein upon the angled contact surface of the cam plate contacting a first roller of the plurality of rollers, the cam plate is adapted to lower to a position that causes the cutting device to cut the shrimp, wherein positioning the cam adjusting assembly between the first position and the second position causes the angle of the angled contact surface to adjust thereby altering a lowering rate of the cam plate to the position causing the cutting device to cut the shrimp.

11. The adjustable cutting assembly of claim 7, wherein the cutting device comprises a blade assembly including a first blade and a second blade, each of the first blade and the second blade having an outer cutting edge, wherein the outer cutting edge of the first blade is spaced from the outer cutting edge of the second blade.

12. The adjustable cutting assembly of claim 11, wherein each of the plurality of blades includes a polygonal opening adapted to align the outer cutting edge of the first blade with the outer cutting edge of the second blade.

13. A meat picking assembly for a shrimp processing machine, the meat picking assembly comprising:
   a meat picking fork mounted to an oscillating arm, the meat picking fork adapted to travel along a generally circular path to pierce a shrimp body to remove shrimp meat from a shrimp shell;
   a meat picking drive assembly operatively coupled to the oscillating arm, the meat picking drive assembly adapted to rotatably drive the meat picking assembly;
   a picker adjuster assembly operatively coupled to the meat picking fork and the meat picking drive shaft, the picker adjuster assembly including an adjuster knob adapted to temporarily decouple at least a portion of the meat picking drive assembly from the meat picking fork to rotatably adjust the meat picking fork between at least a first position along the generally circular path and a second position along the generally circular path.

14. The meat picking assembly of claim 13, wherein the picker adjuster assembly comprises a plurality of grooves disposed on the adjuster knob and a protrusion disposed on a gear of the meat picking drive assembly, wherein the protrusion is adapted to be selectively mated with any of the plurality of grooves to rotatably adjust the position of the meat picking fork along the generally circular path.

15. The meat picking assembly of claim 13, wherein the meat picking drive assembly comprises a drive shaft coupled to the oscillating arm and a drive gear coupled to the drive shaft, the gear adapted to rotatably drive the drive shaft.

16. The meat picking assembly of claim 13, further comprising a meat clamping assembly adapted to retain a shrimp and travel along a generally circular path adjacent to the generally circular path of the meat picking fork, wherein when the meat picking fork is disposed in the first position, the meat picking fork is adapted to be disposed adjacent to a first area of the meat clamping assembly, wherein when the meat picking fork is disposed in the second position, the meat picking fork is adapted to be disposed adjacent to a second area of the meat clamping assembly.

17. A shrimp processing machine comprising:
an adjustable cutting assembly adapted to 1) adjust between a first configuration that forms a cut having a first length on a shrimp and a second configuration that forms a cut having a second length on the shrimp; and 2) adjust between a first position that forms a cut having a first depth on the shrimp and a second position that forms a cut having a second depth on the shrimp; and
an adjustable meat picking assembly adapted to rotatably adjust when a meat picker contacts the shrimp to remove shrimp meat from a shrimp shell;
wherein adjusting the position of the X causes the cutter to contact the shrimp for varying times, wherein adjusting the position of the Y causes the picker to remove meat from the shrimp at varying times along the path to accommodate shrimp of varying sizes.

18. The shrimp processing machine of claim 17, wherein the adjustable cutting assembly comprises:
a cutter drive assembly including a drive gear coupled to an adjustable drive shaft;
an adjustable roller plate coupled to the adjustable drive shaft and disposed adjacent to the drive gear, the adjustable roller plate including a roller coupling portion adapted to secure a plurality of rollers and a roller adjusting portion adapted to rotatably adjust a position of the adjustable roller plate between at least a first position and a second position relative to the drive gear;
a cam plate having a first end and a second end, the cam plate being pivotally supported at the first end and being adapted to contact the plurality of rollers to cause rotation about the first end of the cam plate; and
a cutting device coupled to the cam plate adapted to cut a shrimp;
wherein upon contacting a first roller of the plurality of rollers, the cam plate is adapted to lower to a position that causes the cutting device to cut the shrimp, and upon contacting a second roller of the plurality of rollers, the cam plate is adapted to raise to a position that moves the cutting device away from the shrimp, wherein when the adjustable roller plate is disposed in the first position, the cutting device is adapted to contact and cut the shrimp for a first amount of time, wherein upon rotatably adjusting the position of the adjustable roller plate to the second position, the cutting device is adapted to contact and cut the shrimp for a second amount of time.

19. The shrimp processing machine of claim 17, wherein the cutting device comprises a blade assembly including a first blade and a second blade, each of the first blade and the second blade having an outer cutting edge, wherein the outer cutting edge of the first blade is spaced from the outer cutting edge of the second blade.

20. The shrimp processing machine of claim 17, wherein the adjustable cutting assembly comprises:
a cam plate comprising a first end, a second end, and an angled contact surface;
a cutting device coupled to the cam plate adapted to cut a shrimp;
a cutter bar adapted to be coupled to the cam plate and the cutting device, the cutter bar including a first end coupled to a shaft and a second end adapted to pivotally rotate about the shaft thereby causing the cam plate and the cutting device to pivotally rotate about the shaft; and
a cam adjusting assembly adapted to be coupled to the cam plate and the cutter bar, wherein the cam adjusting assembly is adapted to be adjustably moved between a first position and a second position;
wherein upon adjusting the cam adjusting assembly between the first position and the second position, the angled contact surface of the cam plate is adapted to move relative to the cutter bar thereby selectively adjusting a cut depth on the shrimp performed by the cutting device.

21. The shrimp processing machine of claim 17, wherein the adjustable meat picking assembly comprises:
a meat picking fork mounted to an oscillating arm, the meat picking fork adapted to travel along a generally circular path to pierce a shrimp body to remove shrimp meat from a shrimp shell;
a meat picking drive assembly operatively coupled to the oscillating arm, the meat picking drive assembly adapted to rotatably drive the meat picking assembly;
a picker adjuster assembly operatively coupled to the meat picking fork and the meat picking drive shaft, the picker adjuster assembly including an adjuster knob adapted to temporarily decouple at least a portion of the meat picking drive assembly from the meat picking fork to rotatably adjust the meat picking fork between at least a first position along the generally circular path and a second position along the generally circular path.

22. A method of adjusting a cutting assembly of a shrimp processing machine, the method comprising:
providing a cutter drive assembly including a drive gear coupled to an adjustable drive shaft;
coupling an adjustable roller plate to the adjustable drive shaft at a position adjacent to the drive gear, the adjustable roller plate including a roller coupling portion adapted to secure a plurality of rollers and a roller adjusting portion adapted to rotatably adjust a position of the adjustable roller plate between at least a first position and a second position relative to the drive gear;
pivotally supporting a cam plate having a first end and a second end at the first end such that the cam plate is adapted to contact the plurality of rollers to cause rotation about the first end of the cam plate;
coupling a cutting device adapted to cut a shrimp to the cam plate;
wherein upon the cam plate contacting a first roller of the plurality of rollers, the cam plate lowers to a position that causes the cutting device to cut the shrimp, and upon contacting a second roller of the plurality of rollers, the cam plate raises to a position that moves the cutting device away from the shrimp;

positioning the adjustable roller plate in a first position, thereby causing the cutting device to contact and cut the shrimp for a first amount of time; and positioning the adjustable roller plate in a second position, thereby causing the cutting device to contact and cut the shrimp for a second amount of time.

23. A method of adjusting a cutting assembly of a shrimp processing machine, the method comprising:

coupling a cutting device adapted to cut a shrimp and a cam plate comprising a first end, a second end, and an angled contact surface to a cutter bar including a first end coupled to a shaft and a second end that pivotally rotates about the shaft thereby causing the cam plate and the cutting device to pivotally rotate about the shaft;

coupling a cam adjusting assembly to the cam plate and the cutter bar, the cam adjusting assembly being adjustably moved between a first position and a second position;

selectively adjusting a cut depth on the shrimp performed by the cutting device by adjusting the cam adjusting assembly between the first position and the second position, thereby moving the angled contact surface of the cam plate relative to the cutter bar.

24. A method of adjusting the timing of a meat picking assembly for a shrimp processing assembly comprising a meat picking fork mounted to an oscillating arm, the meat picking fork adapted to travel along a generally circular path to pierce a shrimp body to remove shrimp meat from a shrimp shell, a meat picking drive assembly operatively coupled to the oscillating arm, the meat picking drive assembly adapted to rotatably drive the meat picking assembly, and a picker adjuster assembly operatively coupled to the meat picking fork and the meat picking drive shaft, the method comprising:

selectively decoupling an adjuster knob of the picker adjuster assembly from at least a portion of the meat picking drive assembly from the meat picking fork to rotatably adjust the meat picking fork between at least a first position along the generally circular path and a second position along the generally circular path.

* * * * *

UNITED STATES PATENT AND TRADEMARK OFFICE
CERTIFICATE OF CORRECTION

PATENT NO. : 9,833,005 B1  
APPLICATION NO. : 15/401820  
DATED : December 5, 2017  
INVENTOR(S) : Michael Dancy et al.

It is certified that error appears in the above-identified patent and that said Letters Patent is hereby corrected as shown below:

In the Claims

At Column 11, Line 60, in Claim 6 "The adjustable cutting" should be -- The cutting --.

At Column 14, Line 59, in Claim 22 "gear," should be -- gear; --.

Signed and Sealed this
Twenty-second Day of May, 2018

Andrei Iancu
*Director of the United States Patent and Trademark Office*

UNITED STATES PATENT AND TRADEMARK OFFICE
CERTIFICATE OF CORRECTION

PATENT NO. : 9,833,005 B1  
APPLICATION NO. : 15/401820  
DATED : December 5, 2017  
INVENTOR(S) : Michael Dancy et al.

Page 1 of 1

It is certified that error appears in the above-identified patent and that said Letters Patent is hereby corrected as shown below:

In the Claims

At Column 13, Line 36, "adjusting the position of the X" should be -- adjusting the position of the adjustable cutting assembly --

At Column 13, Line 37, "adjusting the position of the Y" should be -- adjusting the position of the adjustable meat picking assembly --

Signed and Sealed this  
First Day of January, 2019

Andrei Iancu  
*Director of the United States Patent and Trademark Office*